(12) United States Patent
Levchin et al.

(10) Patent No.: US 7,089,208 B1
(45) Date of Patent: Aug. 8, 2006

(54) SYSTEM AND METHOD FOR ELECTRONICALLY EXCHANGING VALUE AMONG DISTRIBUTED USERS

(75) Inventors: Max Levchin, Palo Alto, CA (US); Luke Paul Nosek, Palo Alto, CA (US); Peter Thiel, Palo Alto, CA (US); Scott Alan Banister, Menlo Park, CA (US)

(73) Assignee: PayPal, Inc., Mountain View, CA (US)

( * ) Notice: Subject to any disclaimer, the term of this patent is extended or adjusted under 35 U.S.C. 154(b) by 0 days.

(21) Appl. No.: 09/560,215

(22) Filed: Apr. 28, 2000

Related U.S. Application Data

(60) Provisional application No. 60/172,311, filed on Dec. 17, 1999, provisional application No. 60/144,633, filed on Jul. 19, 1999, provisional application No. 60/131,785, filed on Apr. 30, 1999.

(51) Int. Cl.
*G06Q 40/00* (2006.01)

(52) U.S. Cl. .......................................... 705/39; 705/35
(58) Field of Classification Search .................. 705/39, 705/40, 41, 43, 64, 65, 35
See application file for complete search history.

(56) References Cited

U.S. PATENT DOCUMENTS

| | | | | |
|---|---|---|---|---|
| 5,159,592 A | * | 10/1992 | Perkins | 370/338 |
| 5,329,589 A | | 7/1994 | Fraser et al. | |
| 5,677,955 A | * | 10/1997 | Doggett et al. | 705/65 |
| 5,742,668 A | * | 4/1998 | Pepe et al. | 455/415 |
| 5,778,178 A | * | 7/1998 | Arunachalam | 709/203 |
| 5,790,790 A | | 8/1998 | Smith et al. | |
| 5,893,080 A | | 4/1999 | McGurl et al. | |
| 5,903,874 A | * | 5/1999 | Leonard et al. | 705/14 |
| 5,903,880 A | * | 5/1999 | Biffar | 705/39 |
| 5,915,023 A | * | 6/1999 | Bernstein | 705/39 |
| 5,937,396 A | * | 8/1999 | Konya | 705/43 |
| 5,963,647 A | * | 10/1999 | Downing et al. | 705/39 |
| 5,987,500 A | | 11/1999 | Arunachalam | |
| 6,029,151 A | * | 2/2000 | Nikander | 705/39 |
| 6,032,133 A | * | 2/2000 | Hilt et al. | 705/40 |
| 6,058,382 A | * | 5/2000 | Kasai et al. | 705/41 |
| 6,069,896 A | * | 5/2000 | Borgstahl et al. | 370/401 |

(Continued)

FOREIGN PATENT DOCUMENTS

GB 9709748.9 2/1999

*Primary Examiner*—Alain L. Bashore
(74) *Attorney, Agent, or Firm*—Park, Vaughan & Fleming LLP

(57) ABSTRACT

A system and method for facilitating a value exchange transaction. A first party initiates the transaction by selecting or providing an identifier of another party and the value to be exchanged. The second party may be identified by a pre-existing identifier such as an electronic mail address, telephone number, etc. The system informs the second party of the transaction (e.g., using the specified pre-existing identifier). If the second party is not a registered user of the system, he or she is invited to register and complete the transaction. The system may comprise a synchronization server for exchanging transaction details with users' devices, a communication server for registering new users and/or conducting transactions online and a financial server for interacting with external financial institutions.

33 Claims, 4 Drawing Sheets

U.S. PATENT DOCUMENTS

| | | | |
|---|---|---|---|
| 6,070,150 A * | 5/2000 | Remington et al. | 705/40 |
| 6,076,068 A * | 6/2000 | DeLapa et al. | 705/14 |
| 6,192,407 B1 | 2/2001 | Smith et al. | |
| 6,212,556 B1 | 4/2001 | Arunachalam | |
| 6,223,168 B1 | 4/2001 | McGurl et al. | |
| 6,260,024 B1 * | 7/2001 | Shkedy | 705/37 |
| 6,324,526 B1 * | 11/2001 | D'Agostino | 705/44 |
| 6,330,544 B1 * | 12/2001 | Walker et al. | 705/14 |
| 6,338,050 B1 * | 1/2002 | Conklin et al. | 705/80 |
| 6,553,346 B1 * | 4/2003 | Walker et al. | 705/1 |
| 6,694,300 B1 * | 2/2004 | Walker et al. | 705/14 |

* cited by examiner

SYSTEM AND METHOD FOR ELECTRONICALLY EXCHANGING VALUE AMONG DISTRIBUTED USERS

This application claims the benefit of U.S. Provisional Patent Application 60/131,785 (filed Apr. 30, 1999), 60/144,633 (filed Jul. 19, 1999) and 60/172,311 (filed Dec. 17, 1999).

BACKGROUND

This invention relates to the fields of computer systems and communications. More particularly, a system and methods are provided for facilitating the exchange of value among distributed users through computing devices.

Existing methods of transferring or exchanging values among multiple persons have many shortcomings. For example, the use of cash requires regular replenishment, creates the need to make change, allows the possibility of theft or loss and has no built-in or easy method of keeping records concerning cash payments and receipts. Similarly, checks can be forged, they often provide only rudimentary record keeping (e.g., check stubs) and allow one to unwittingly overdraw a checking account. Credit cards may mitigate some of the problems with cash and checks, but cannot be used for making payments or exchanging value between two or more individuals.

In addition, the formalities of existing value exchange transactions can make them inefficient or difficult to complete. For example, transferring money to another person's bank or other financial account may require one to know the person's account number. That person may understandably be reluctant to divulge such information.

Thus, what is needed is a system and method for enabling value transfers without all the shortcomings of existing means and techniques. It would be desirable, for example, to allow a value exchange transaction to be conducted using a known or common identifier of a person (e.g., electronic mail address, telephone number) rather than other, more sensitive, information.

SUMMARY

In one embodiment of the invention a system and methods are provided for conducting a value exchange between two or more persons using a distributed value exchange system.

In this embodiment the system may comprise one or more system servers configured to register a person or other entity (e.g., a business) as a system user and allow him or her to conduct value exchange transactions with persons who may or may not also be registered users. A user then employs a client computing device (e.g., a handheld, palmtop or desktop computer, a web-enabled telephone, a two-way pager) to initiate or conduct a value transfer. The value exchange may be conducted while online with (e.g., connected to) the system, while offline, while connected (e.g., via wireless connection) to another user's device, etc. When the transaction is submitted to the system, it notifies transaction parties that are as-yet unaware of the transaction and attempts to clear or finalize the transaction and adjust the users' account balances appropriately.

A communication server may be configured to receive connections (e.g., wired and/or wireless) from persons wishing to become registered users. A synchronization server may be configured to facilitate the synchronization of user's client devices with the system. During synchronization, users' devices may submit transactions to the system, receive information on new or cleared transactions, synchronize account information on the system with the information on the client device, etc. A security server may be configured to enforce security procedures, possibly using asymmetric and/or symmetric cryptographic techniques. A financial server interacts with other system servers and external financial institutions to enable a user to inject value into the system and withdraw value from the system. One or more databases may store account information for users (e.g., account information, transaction details) and help coordinate system activity.

In one method of conducting a value exchange a person registers with the system, an account is created for him and system software is downloaded to his client device. The user may then conduct transactions on his client whether he is connected to the system or not. When not connected, the client stores transaction details and, when later connected to the system for synchronization purposes, uploads his transactions to the system and may receive transactions initiated by other users. Each transaction may include an identifier of another party to the transaction and the value to be exchanged. In one embodiment of the invention transaction parties may be identified by identifiers that have meaning outside the system, such as electronic mail addresses, telephone number, social security numbers, etc. Thus, the user may initiate a transaction with a person who is not a registered user as long as he knows an appropriate identifier of the person.

When the system receives a new transaction initiated by a user it attempts to contact the other party or parties using the identifier(s) provided by the initiating user. If another party is a registered user, the system may also know other methods of contacting the party. For a party who is not already a user, he or she is invited to connect to the system, register and complete the transaction.

Virtually any means of value transfer may be associated with the system. Users may introduce value into their system accounts via credit card, check, cash, electronic funds transfer, direct deposit, etc. Value may be withdrawn from the system using the same or similar processes. The value that is exchanged between transaction parties may be monetary (e.g., represented by United States dollars or other currency) or have some other form, such as credits, affinity points, frequent flier miles, vouchers, barter points, etc.

DETAILED DESCRIPTION

Figure 1:
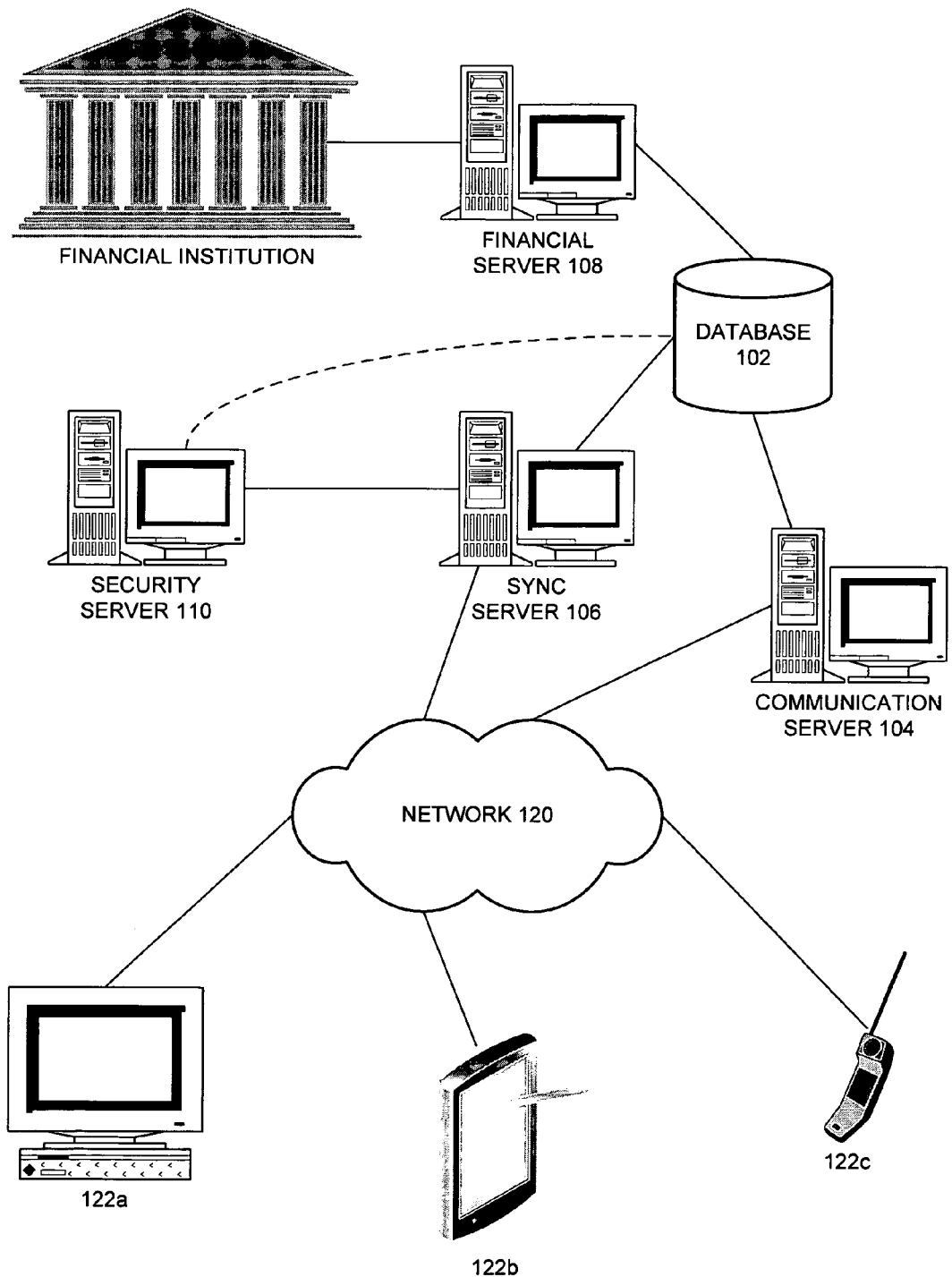
FIG. 1 is a block diagram depicting a system for conducting value exchange transactions in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display, wired/wireless communication capability) are omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

Introduction

In one embodiment of the invention a system and method are provided for facilitating an exchange of value between two or more persons using client computing devices. Values that are exchanged may be monetary in nature (using any currency) or may take other forms, such as credits, debits, discounts, vouchers, certificates, mileage (e.g., frequent flier miles), etc. The computing devices used to conduct an exchange transaction may or may not be portable in nature, and may employ virtually any communication media, including both wired and wireless. In one implementation of this embodiment, at least one user employs a portable computing device such as a handheld or palmtop computer, a smart telephone, a two-way pager, etc. A computing device suitable for this embodiment may always be linked to or in communication with another device (e.g., a system server), such as a networked personal computer, or may be disconnectable, such as a hand-held personal digital assistant (PDA). Thus, a value exchange transaction may be conducted offline or online, while connected or disconnected from other system components.

A system according to this embodiment of the invention includes at least one highly accessible computer server configured to facilitate value exchanges. Illustratively, a user who wishes to initiate a value exchange or value transfer with another party is registered with the server beforehand (e.g., an account is established for the user on the server). The other party may or may not be a registered user at the time the transaction is initiated or communicated to the system.

In one method of conducting a value exchange according to this embodiment of the invention an entity involved in the exchange may be known by an identifier that has meaning or use outside of the system, such as an electronic mail address, a telephone number, a social security number, etc. Illustratively, each such identifier is only associated with one person or entity, thus promoting accountability. In an alternative method, however, multiple users or accounts may be associated with an identifier.

In one implementation of a method of conducting a value exchange a registered user of the system initiates an exchange with an unregistered party by identifying that party to the system server by his or her electronic mail address. The registered user may provide various details of the value exchange, such as the form of the value (e.g., a monetary amount, a number of credits or affinity points), a date on which to effect the transfer, the unregistered party's name, etc. The system may then attempt to contact the unregistered party (e.g., via the provided electronic mail address), notify him or her of the value exchange, identify the initiating user and invite the unregistered party to connect to the server and close the exchange. The unregistered party may be required to register with the system in order to close the transaction. For example, if the value exchange is to the benefit of the unregistered user, he or she may wish to leave the value in the system in order to use it to conduct an exchange with yet another party. Alternatively, the unregistered party may be permitted to provide just enough information (e.g., credit card number, address) to allow the system to close the transaction, without being registered.

In different embodiments of the invention the value exchange may be initiated by the person who owes or is owed the value to be exchanged. Further, the value that is exchanged may be of virtually any form and/or may be transformed in nature. For example, a monetary amount or a credit or voucher held by a first user and accepted by a second user may be transferred from the first user to the second user in exchange for goods or services. Or, the value may change from one currency to another or from being monetary in nature to being represented by credits with a merchant, frequent flier miles, or some other value. Thus, a user may pay for goods or services with value in many different forms, including currency or points that are used only within the system (e.g., for transactions between users).

The system may also be configured to allow users to perform normal banking operations (e.g., withdrawals, deposits, transfers), stock transactions, electronic ticketing, etc. In another embodiment of the invention a third party may be involved to hold the value in escrow until a transaction is closed.

Value may be introduced into the system (and credited to a user's account) via cash, check, debit, or virtually any other method that is presently used or that becomes accepted in the business community. Value may exit the system in these and similar forms.

In alternative embodiments of the invention a distributed system described herein may be used for forms of communication other than value exchanges. For example, in one alternative embodiment the system may be used to spread or disperse software among multiple users. Illustratively, a registered system user could then provide an unregistered person with the system software and thereby allow them to conduct a transaction. Advantageously, the software could be transmitted between users' client devices using wired or wireless communications.

One Embodiment of a System for Facilitating a Value Transfer

FIG. 1 depicts an illustrative system for facilitating value transfers according to one embodiment of the invention.

Alternative embodiments of the invention may incorporate any subset of the components of the illustrated system.

The system of FIG. 1 includes central database 102, which is configured to store various information used to facilitate value exchange transactions. Illustratively, the information stored in database 102 includes accounts for registered users of the system as well as various information pertaining to unregistered users participating in or invited to participate in a transaction. User information for registered and/or unregistered users may include user identifiers (e.g., name, electronic mail address, telephone number, network address, physical address), transaction records, account balances in one or more different forms (e.g., money, frequent flier miles, store credits, affinity points, vouchers, coupons, discounts), preferred communication methods (e.g., electronic mail, wireless voice), security data, etc.

In the system of FIG. 1, database 102 is accessed by communication server 104, synchronization server 106, financial server 108 and possibly security server 110. In this embodiment, communication server 104 and/or other system servers are configured to interact with one or more users through communication network 120. For example, communication server 104 may be or may include a web server, telephone switch, DSLAM (Digital Subscriber Line Access Multiplexer), etc.

A network presence, such as a web site on the Internet, that is hosted by communication server 104 may serve as a primary access point to the system for new and, possibly, existing users. Illustratively, users are given account names and passwords with which to access the system after being registered. Other forms of security (e.g., digital certificates, biometric devices) may be employed in other embodiments of the invention.

In one embodiment of the invention a user may download software for his or her computing device from communication server 104. In particular, communication server 104 may allow a person to register with the system, access and/or modify account information, conduct and clear transactions, etc. A user may be required, however, to register with the system before being able to initiate or close a transaction.

Synchronization server 106 in the illustrated embodiment is configured to synchronize information stored on the system with users' client computing devices and locally stored data. Illustratively, a user may connect to the synchronization server to upload and/or download details of transactions (e.g., value exchanges) that involve the user. During a synchronization session, a user's client may receive updated account information (e.g., reflecting cleared transactions), may authorize the system to charge additional funds to the user (e.g., by charging a credit card or transferring funds from a bank account), access customer service, query the status of a transaction, initiate a new transaction, etc.

Financial server 108 is configured to interface with one or more financial institutions, which may, in one embodiment of the invention, be external to the system. Thus, the financial server may interact with credit card companies, banks (including traditional and online banks) and other entities that handle or process value in suitable forms; in particular, the financial server may be configured to transfer funds through the ACH (Automated Clearing House). Financial server 108 may be configured to automatically generate a charge or credit to a user's account with an external financial institution when the user's system account balance falls below or rises above a predetermined threshold. Further, the external value that the system can access for a user through financial server 108 may affect the number of transactions that the user can conduct or the amount of value in a transaction.

Security server 110 may cooperate with one or more of database 102, communication server 104, synchronization server 106 and financial server 108 to apply, ensure or enforce security for value exchanges and actions related to value exchanges. In one embodiment of the invention digital signatures may play a large part of the security scheme. DSA (Digital Signature Algorithm), a variant thereof (e.g., ECDSA or Elliptical Curve DSA), RSA or other digital signature protocol may be used. Symmetric cryptographic schemes such as DES (Digital Encryption Standard) may also be applied in the same or different embodiments. Message authentication codes may be used to verify the integrity and authenticity of messages exchanged between the system and a user.

In a present embodiment of the invention public key encryption techniques may be used with digital certificates to create cryptographically verifiable transactions and prevent their repudiation. Symmetric encryption schemes may be employed for secure storage of data (e.g., on users' client devices and/or on the system).

Illustratively the organization operating the value exchange system may act as a Certificate Authority and certify individual users, while certified users may, in turn, certify individual transactions. Certified users may be issued identity certificates for use in value exchange transactions.

An identity certificate may include information such as the user's name, electronic mail address (or other meaningful identifier that identifies the user, such as a telephone number or social security number), account number or name, etc. Illustratively, an identity certificate also includes a public key of the user, which may be used to verify the authenticity of transactions conducted by the user.

Individual users generate transaction certificates for transactions they conduct or initiate and the system authenticates them with the users' public keys (e.g., during synchronization). A transaction certificate may include the value being exchanged, an identifier of another party to the transaction, other details (if necessary or desired), and may be signed with the user's private key. In one embodiment, a user's client computing device generates the public/key pair during user registration, and the private key is retained only on the client device.

The illustrated system may communicate with users through various types of communication media. Communication network 120 may thus comprise a traditional wired network (e.g., the Internet) and/or a wireless network usable by portable devices such as portable computers (e.g., palmtop or handheld), smart (e.g., web-enabled) telephones, two-way pagers, etc. Therefore, users may interact with the system by operating devices such as client computer 122a, portable client computer or digital assistant 122b, wireless telephone 122c and/or other devices capable of communicating with communication server 104 and/or synchronization server 106. Illustratively, portable client computer 122b may be configured to conduct value exchanges with, or communicate them to, the system independently and autonomously. Or, in an alternative embodiment, portable client computer 122b may be operated to record details of an exchange in a disconnected mode and then, when connected (e.g., docked) with another computing device (e.g., computer 122a) to forward those details to the system in order to finalize the exchange, and/or synchronize with the system.

A portable client device employed by a user to participate in a value exchange transaction may incorporate a series of instructions for interacting with the system. For example, in one embodiment of the invention a user's client device includes a wallet application that allows the user to access his or her account balance(s) while connected to the system and/or while disconnected from the system. Illustratively, in this embodiment of the invention a user's device periodically connects to synchronization server 106. During such a connection the user's device communicates with the server to send and receive new transaction information (e.g., details of new value exchanges involving the user) and/or receive updated account information (e.g., to reflect closed transactions). The user may also authorize or perform other activities involving his or her account, such as transfer value to or from a system or institution external to the value exchange system.

One Method of Conducting a Value Exchange

In one embodiment of the invention a value exchange transaction may be conducted by a single user (e.g., with his client device), while connected to or disconnected from a system server (e.g., communication server 104, synchronization server 106 of FIG. 1) or another party's client. In particular, in one embodiment of the invention a user initiates a transaction by submitting it to the system, which then takes action to close the transaction by notifying another participant, and possibly registering the other participant with the system. In an alternative embodiment, however, a transaction may be conducted in a direct communication between two (or more) parties, after which details of the transaction are submitted to one of the system servers. In this alternative embodiment, at least one of the parties (e.g., from whom value is being transferred) may be required to be registered with the system.

Illustratively, a transaction cannot be closed or finalized until the system learns of the transaction from one of the involved parties, identifies the other participant(s) and determines how to transfer the value. Closure of a transaction may include the actual transfer of value from one party (e.g., in a first account and/or form) to a second party (e.g., to another account and/or form). Parties to a transaction may need to be registered with the system and/or provide certain information (e.g., to identify a party, verify a party's identity, determining how to transfer value to or from the party) before the transaction can be closed.

In this section, one or more methods are described for using a value exchange system such as that depicted in FIG. 1 to effect a value exchange between two or more parties. The methods and operations described here may be altered or modified for different types of computing devices that a party may employ and/or different system or transaction configurations without exceeding the scope of the invention.

In one embodiment of the invention the system of FIG. 1 may be envisioned as a system for facilitating or conducting a financial transaction involving two or more persons. Illustratively, at least one person in the transaction is already registered (e.g., has an account) with the system so that at least one form or conduit for transferring value exists. Advantageously, however, a registered user may initiate a transaction with an unregistered party, who may be identified to the system with an existing identifier such as an electronic mail address, telephone number, IP (Internet Protocol) address, etc. Thus, in this embodiment identifiers associated with unregistered users (and/or registered users) may already have significance or use outside of the system and there may thus be some degree of assurance that they can be reached through or with those identifiers.

Once known to (e.g., registered with) the system, however, a user may conduct value exchanges and other transactions using portable, semi-portable and other computing devices. In particular, the system enables a user to conduct a secure transaction from his or her client device directly (e.g., to another user or person having a compatibly equipped device) or indirectly (e.g., by describing or submitting the transaction to a system server, which may then notify another transaction party).

Illustratively, in a direct transfer the parties may exchange cryptographic tokens in order to prevent later repudiation and authenticate the transaction to the system, and, once the system is informed of the transaction by at least one party, the transaction can be closed. In an indirect transfer the system may contact another party (e.g., by electronic mail or telephone) on behalf of an initiating user and, if the party is not already registered, invite that party to register with the system in order to receive and/or conduct their own transfers or exchanges. In one embodiment of the invention the invited party may, of course, be able to satisfy his or her part of the transaction (e.g., receive or pay money or other value) without registering with the system. For example, he may send payment to or receive payment from the system in a traditional form (e.g., check, credit card, debit card).

Figure 2:
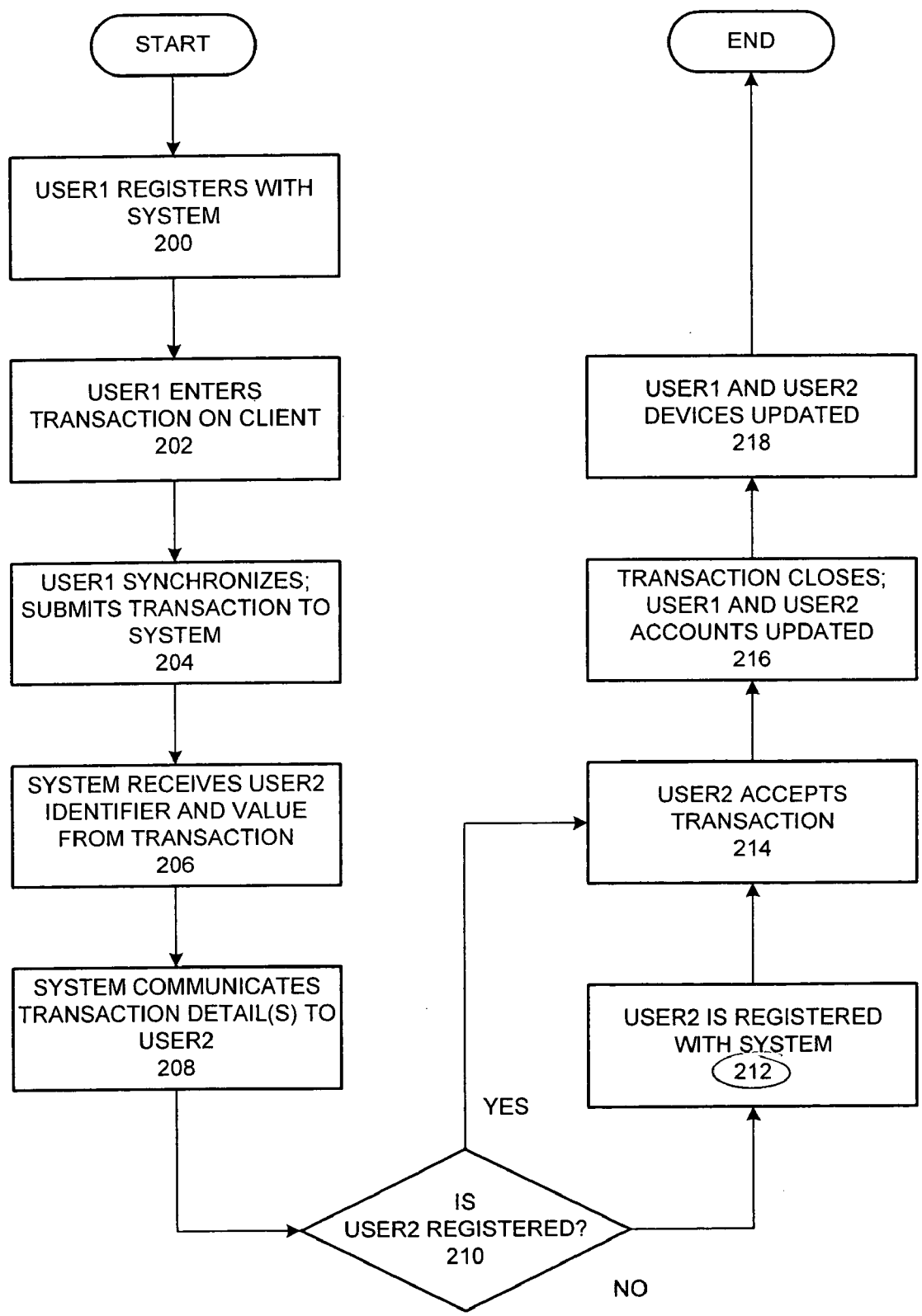
FIG. 2 is a flowchart illustrating one method of conducting a value exchange transaction in accordance with an embodiment of the invention.

With reference now to FIG. 2, an illustrative method of conducting an indirect value exchange transaction according to one embodiment of the invention is presented. The illustrated method is suitable for use with the system depicted in FIG. 1.

In state 200, a first user (USER1) registers with the system, one method of which is described in a following section. Illustratively, as part of the registration process USER1 provides his or her name and residence/postal address, a meaningful identifier (e.g., electronic mail address, telephone number, social security number) and pertinent financial information. Financial data provided by USER1 may include a credit card or bank account to be credited or charged for individual transactions and/or when the value of a transaction exceeds a predetermined limit. In particular, users may be assigned limits on how much value they can transfer through the system, based on the financial data regarding them, the degree to which their personal information (e.g., address) can be verified, etc. The limit may affect the size or number of uncleared transactions that a user may be involved in at a given time.

A registered user may be assigned an account number or other identifier within the system. As mentioned above, however, a party may be included in a transaction by specifying an externally meaningful identifier (e.g., electronic mail address, telephone number) associated with the party. USER1 may register with the system, and conduct transactions, using virtually any form of client device (e.g., handheld or palmtop computer, desktop, web-enable telephone) having the ability to communicate with another computing device (e.g., a system server).

In the presently described embodiment of the invention a digital certificate is generated for or provided by USER1 as part of the registration process. Illustratively, a certificate generated for USER1 includes USER1's name and electronic mail address (or other meaningful identifier) and a public key signed by the system, all of which are encrypted by a code (e.g., a Personal Identification Number or PIN) previously assigned to or chosen by USER1. In one method of registering a user described in a later section, a public/private pair of cryptographic keys is generated (e.g., by the user's client or security server 110) and the private key is retained only by the client or other computer system operated by the user.

In state 202 USER1 enters a transaction in his client using software provided by the system. Illustratively, USER1 simply enters the electronic mail address, telephone number or other identifier of a party (e.g., USER2) with whom he wishes to exchange value, plus the value to be transferred. In this embodiment, the value may flow in either direction (i.e., from or to USER1). The amount of value that USER1 may transfer (if the value is to flow to USER2) may be limited to his system account balance (e.g., which may be stored on his client and updated when the client synchronizes with the system). This amount may be decreased by any other transfers (to other users) that have been requested or initiated but not yet cleared. If, however, USER1 has provided other payment arrangements (e.g., through a credit card, electronic funds transfer), then he may be able to exceed his account balance.

USER1 may be required to enter a security code (e.g., Personal Identification Number or password) to activate the client system software before entering a transaction. Illustratively, if an incorrect code is entered a predetermined number of times (e.g., ten), the ability to enter transactions may be disabled and USER1 may be required to contact or synchronize with the system (as described below) in order to re-enable the client software.

The software may maintain a list of all parties with whom USER1 has previously conducted a value exchange transaction, in which case he may just select USER2's identifier if she is included in the list. The client system software employed by USER1 may offer multiple transaction options. For example, USER1 may be able to initiate a unilateral transfer to (or from) USER2. USER1 may also be able to initiate a bilateral transaction if his client and USER2's client are capable of direct (e.g., wireless) communication. Yet further, USER1 may be able to transmit the client system software to USER2's client device. In this case, however, USER2 may not be able to transfer value to another party until she registers with the system (and opens an account).

At some time after entering the transaction in his client, in state 204 USER1 synchronizes with synchronization server 106. In particular, USER1 initiates whatever commands or actions are necessary to connect his client with the synchronization server. The client may be able to connect directly, perhaps through a wireless connection, or through any number of intermediate devices or media (e.g., the Internet). In particular, if USER1 's client is a portable device, he may be required to dock it or otherwise connect it to another computer system in order to initiate a connection to synchronization server 106.

Synchronization may be required on a regular basis (e.g., at least once every thirty days). If this requirement is not satisfied, the client software may automatically prevent USER1 from making payments or initiating transactions. In addition, transactions made on USER1's client may be automatically canceled or nullified if he does not synchronize within a certain period of time (e.g., thirty days) after entering the transaction in the client.

In a typical synchronization process according to one embodiment of the invention, USER1's client connects to synchronization server 106 and identifies USER1 by his system account number (and/or electronic mail address, telephone number or other meaningful identifier). The server locates a user record for USER1 (e.g., in database 102) and retrieves a code (e.g., a PIN) assigned to or associated with the user. A digital certificate associated with USER1, and which is to be transmitted to USER1 during synchronization, is then encrypted with this code; this digital certificate may be the certificate that was generated when USER1 was registered. Illustratively, however, the digital certificate may be augmented with one or more transaction certificates for transactions involving USER1 that have been reported to the system by other users. The digital certificate may also be used to pass a new code (e.g., PIN) to USER1.

If there is no digital certificate stored on the system for USER1, the synchronization server requests USER1's password and electronic mail address (or other identifier). If this information is verified, a new key pair may be generated and a new digital certificate issued.

After the initial synchronization connection is established, the client sends the present transaction (and any others it has stored and not already sent) to the server. The transactions may be sent using digital transaction certificates, as described above. The client is informed if any previous transactions of USER1 have cleared (e.g., another party in a previous transaction may have connected to the system and accepted the transaction), in which case they may be removed from the client. The server may then prioritize uncleared transactions according to some criteria (e.g., date, time, other party(ies), transaction value, direction of value transfer).

A user's client (and/or a system server) may maintain a transaction log in which to record transactions conducted by and/or involving the user. An entry is then made in the log when the user initiates a transaction. An entry may also be made in the log for each transaction (e.g., initiated by another party) that the client learns of from a system server (e.g., during synchronization). Entries may be removed or archived after their associated transactions clear.

In one method of the invention account balances are altered during the synchronization process. In particular, USER1's account is debited for all values being transferred away from USER1. Conversely, however, USER1's account may not be credited for incoming value transfers initiated by USER1 until the other parties to such transfers synchronize or otherwise acknowledge or approve them (e.g., until the transactions clear). If USER1's system account has an insufficient balance to make a transfer (e.g., to USER2), his credit card or other value stream may be tapped (e.g., by financial server 108) to cover them.

Thus, in state 204, once USER1 has connected to the synchronization server the transaction is communicated to the system along with any other transactions not yet submitted. In exchange, the synchronization server may inform the client of any closed transactions and download transactions that involve USER1 that were initiated by other parties. Therefore, the synchronization process of state 204 may involve updating USER1's client and the system with various transactions to which USER1 is a party. Account balances on a system server and/or the client may be altered accordingly during the synchronization process or afterwards.

In state 206 a system server (e.g., synchronization server 106) receives the details of the USER1/USER2 transaction (e.g., including an identifier of USER2 and the value to be transferred). If the value exchange is from USER1 to USER2, USER1's account may be automatically debited by the amount of the transfer; this may require a charge to a credit card or bank account associated with USER1. In the illustrated embodiment, however, account updates may be postponed until a later stage of the procedure.

In state 208 the system attempts to inform USER2 of the transaction. In this embodiment the system uses the identifier submitted by USER1 (e.g., by generating an automated electronic mail message or voice message). If, however, USER2 is a registered system user, her account may be examined to determine if she has a different, preferred, method of receiving transaction communications. If USER2 is not a registered user, the automated message includes details concerning what she should do to receive the value. For example, a system web site hosted by communication server 104 may be identified and USER2 invited to connect to the site and register.

In state 210, which may occur simultaneously with state 208, the system determines whether USER2 is a registered user. If so, then she need not register and the procedure continues at state 214.

In state 212, however, USER2 is unregistered at the time of the transaction with USER1 and therefore may be required to register before the transaction can be closed, particularly if the value is to be transferred from USER2 to USER1. By registering with the system, USER2 may receive or submit the transaction value using virtually any normal means for conveying value (e.g., credit card, check, debit card, electronic funds transfer). However, in one alternative embodiment of the invention USER2 may not be required to register. In particular, in this alternative embodiment she may be able to make a one-time payment to or withdrawal from the system (e.g., with a credit card or check).

In state 214 USER2 accepts or acknowledges the transaction. Acceptance may be implied if she was an unregistered party and registers in response to the invitation from the system. State 214 may only be required for transactions in which the value is to be transferred from USER2 to USER1. In other words, when a first user initiates a transaction to transfer value to another user, the other user's acknowledgement may not be needed. However, if a first user initiates a transaction to receive value from another user, it may be necessary to receive approval from the other user before closing the transaction.

In state 216 the transaction is closed by altering system account balances for USER1 and USER2 according to the value of the transaction. In addition, the user that is providing value to the other party may need to inject additional value into the system in order to cover the transaction. Thus, financial server 108 may charge the user's credit card, conduct an electronic funds transfer or take other action. Further, if there is a limit or maximum on the receiving user's account balance, the financial server may credit value to his or her credit card, debit card, bank account, etc.

In state 218 the client devices for USER1 and USER2 are updated according to the transaction (and, possibly, other transactions). If, however, USER1 or USER2 are disconnected from the system at the time, their devices may be updated (e.g., by synchronization server 106) the next time they connect. After state 218 the illustrated procedure ends.

In a present embodiment of the invention USER1 may be granted affinity points or some other reward for introducing a new user to the system. In particular, if USER2 was not a registered user at the time USER1 submitted the transaction to the system, he may be rewarded if USER2 registers in response to the transaction notification from the system.

The embodiment of the invention illustrated in FIG. 2 and described above is but one method of conducting a value exchange with a system such as that depicted in FIG. 1. This method may be readily modified to accommodate the use of various types of client devices, communication media and communication sequences. In particular, the preceding method may be applied as described, or slightly altered, to conduct a value exchange between a registered user and an unregistered party, between two or more registered users, or in virtually any circumstance in which value is being exchanged.

Figure 3:
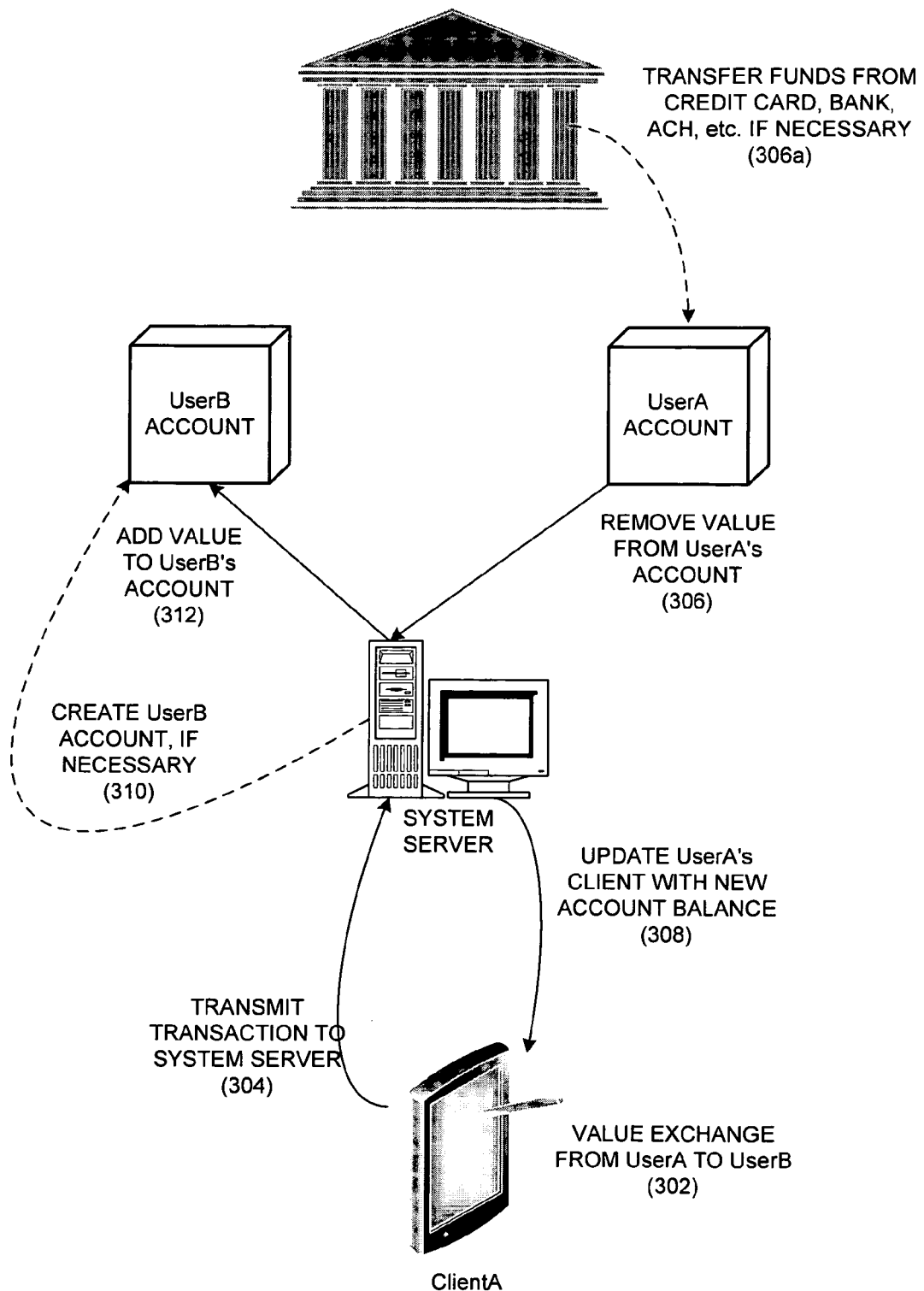
FIG. 3 depicts one form of an indirect value exchange transaction from a first user to a second user performed on the first user's mobile client device in accordance with an embodiment of the invention.

FIG. 3 depicts one form of an indirect value exchange performed by one user on a mobile client device. In FIG. 3 UserA enters the value exchange in her device, ClientA. The transaction is then submitted to a system server, possibly during a synchronization process. The amount of the value (if UserA is authorized to transfer the full value) is removed from UserA's account and UserA's client device is updated with her new account balance. Additional funds or value may be retrieved from a bank, credit card, ACH, or other financial source associated with UserA if her account balance falls below a minimum level or the transfer is necessary in order to complete the requested exchange. The value is deposited in UserB's account, which may require an account to be created for UserB if he is not already a registered user.

In one embodiment of the invention the value of a transaction may be held in escrow. In this embodiment the user initiating the transaction chooses an option to have the value placed in escrow. If this user is the payor (e.g., the party from whom value is being transferred), the user's account may be debited as soon as the transaction is communicated to the system, but instead of being credited to the specified recipient, it is held in an escrow account. Illustratively, the value recipient is notified that a value is being held and, possibly, the conditions for releasing it. The system may require that both parties agree before the funds are transferred to the recipient or back to the payor. The system may be configured, by default, to complete the transfer after a certain period of time if there is no objection from a party or, conversely, to cancel the transaction unless one or both parties affirm it within the specified period of time.

The following sub-sections describe methods of conducting a value exchange in different environments or circumstances from those described above.

Conducting an Online Value Exchange

In one alternative method of conducting a value exchange, a user connects to the value exchange system (e.g., the system of FIG. 1) through an Internet connection (e.g., from a desktop or wireless client). In this method, communication server 104 of the system of FIG. 1 comprises a web server hosting a web site for the system. A user wishing to initiate a transaction connects to communication server 104 and satisfies the necessary security requirements by providing a username, account name or other identifier (e.g., electronic mail address, telephone number) and a password. In one alternative of this embodiment, a cryptographic security policy may be enforced that requires the user to provide cryptographic authentication or a security token.

The user completes an online form by providing information such as an identifier (e.g., electronic mail address, telephone number, social security number, account name) of another party to the transaction and the value to be transferred. Also, the user may specify whether the value is to be transferred from him to the other party or vice versa. The user's interface with the system (e.g., the web page presented to the user when he connects or logs in) may be personalized to the user. In particular, identifiers of parties with which the user has transacted in the past may be available for ready selection, in which case the user need not remember or enter an identifier but can, instead, pick one from a list.

If the other party is already a registered system user, the system may then proceed to conduct the value transfer. Illustratively, if the value is to flow from the initiating user to the other party, the system may not require the approval or authorization of the other party to finalize or close the transaction. The system may simply send notification of the transaction (e.g., via electronic mail) to the party. In contrast, if the value is to flow from the other party to the initiating user, the system may require the other party's approval before closure. When the value of the transaction flows from the initiating user to the other party, the user's account may be debited by the amount to be transferred even before the transaction closes (e.g., before the other party accepts the transaction).

If the other party is not a registered system user, the system notifies the party of the pending transaction by using the identifier provided by the initiating user. The notification may thus be sent via electronic mail. Illustratively, the notification identifies the user who initiated the transaction, informs the other party of the amount of the transaction and specifies how/where (e.g., a web page or site) to complete the transaction. In order to receive the value or submit the value requested by the initiating user, the other party may then connect to the system and register. A method of registering a new user is described in a following section.

Unlike an offline transaction (e.g., using a disconnectable portable computing device), when conducting a transaction online a user may be able to access account information and/or close the transaction in real time.

The method of the invention described in this sub-section is suitable for application with clients that can establish and maintain a real-time link with the system, whether through the Internet via a wired or wireless connection, through a telephone connection (wired or wireless), etc.

Conducting a Direct (Client to Client) Value Exchange

In one alternative embodiment of the invention a method is provided in which two parties employ their client computing devices to conduct a value exchange. If they are disconnected from the system while conducting the transaction, after the transaction one or both of them submit the transaction to the system (e.g., via communication server 104 or synchronization server 106 of the system of FIG. 1). This method is particularly suited to the use of mobile computing devices and smart or web-enabled telephones that can communicate directly (e.g., via a wired or wireless communication medium) with another client.

The option to conduct a client-to-client transaction may be just one of several options available to a user. For example, the system software installed on the client device may also enable one user to transmit the system software to another user, conduct a unilateral transaction (e.g., as described above in conjunction with FIG. 2), view his or her account balance(s) (which are updated each time the client is synchronized) or transaction log, use a calculator, etc.

If the user elects to make a client-to-client transaction, the user's client may automatically attempt to establish contact with another client. The client may be configured to make such connections in a wireless or wired mode.

In this method each user activates his or her computing device and one of them operates the installed system software to initiate a payment to or from the other user. This may require the user to enter a Personal Identification Number (PIN) to activate the software. The other user's client may then prompt him or her to accept or reject the transaction, particularly if the value of the transaction is to be transferred from the other user to the first user. If only one user has the software installed, the software may be transmitted to and installed on the other user's device as part of, or as a precursor to, the transaction.

Illustratively, the account balance of the user giving the value (e.g., as indicated in the system software) decreases when the transaction is conducted. Closing the transaction may require the paying user's credit card, debit card or other method of providing value to the system to be charged (e.g., if his or her account balance is too low). The transaction may not be closed until one of the users forwards the transaction to the system (e.g., during a synchronization session with synchronization server 106). The client software may allow a user to make notes or comments to be saved in a transaction log with the details (e.g., value, other user's identifier) of the transaction.

In one method of conducting a direct value exchange, the users may exchange digital certificates (e.g., transaction certificates) or other tokens in order to authenticate each other and/or demonstrate to the system that the transaction is valid and was not spoofed or faked by one of the parties.

Figure 4:
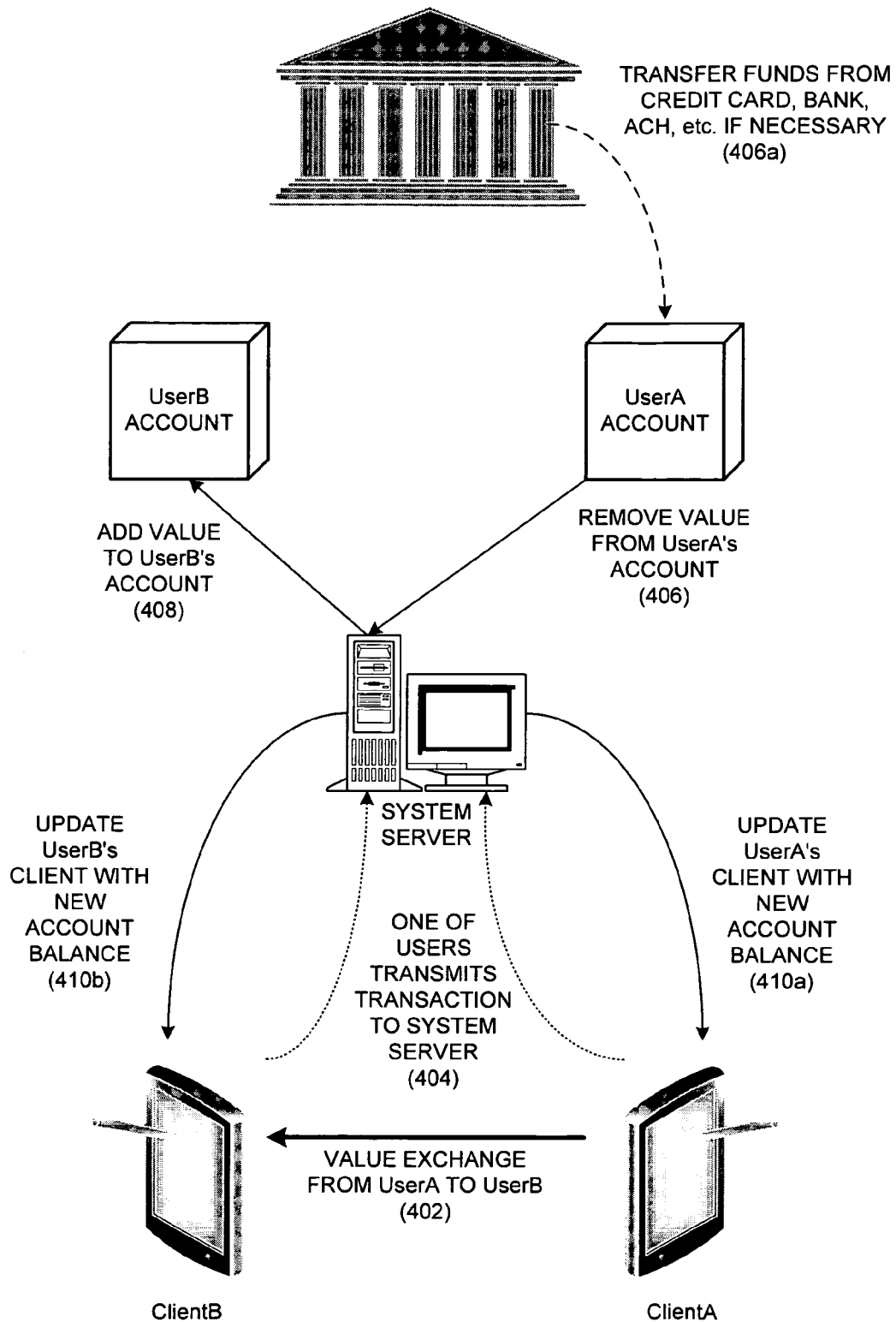
FIG. 4 depicts one form of a direct value exchange from a first user to a second user conducted with the user's mobile client devices in accordance with an embodiment of the invention.

FIG. 4 depicts one form of a direct value exchange performed between two users having mobile client devices. In FIG. 4 UserA electronically transfers the value from her ClientA to UserB's ClientB. The transaction is then submitted to a system server by one of the transaction parties, possibly during a synchronization process. The amount of the value (if UserA is authorized to transfer the full value) is removed from UserA's account and deposited in UserB's account. Additional funds or value may be retrieved from a bank, credit card, ACH, or other financial source associated with UserA if her account balance falls below a minimum level or the transfer is necessary in order to complete the requested exchange. Both of the users' client devices are updated with their new account balances.

Canceling a Value Exchange

In various situations a user may wish or need to reverse or cancel a value exchange. For example, while attempting to conduct a transaction with another party a user may provide an incorrect identifier—such as a non-existent or invalid electronic mail address or a valid electronic mail address that is associated with someone other than the desired party. In one embodiment of the invention a value transfer may be undone if the situation warrants. In particular, if it is determined that an exchange should be undone, the system may cancel the value transfer, reverse it, redirect it (e.g., transfer the value to a third party) or nullify it in some other manner.

If an identifier of a transaction party (e.g., electronic mail address) provided by a user is unusable (e.g., invalid), the user may specify whether to reverse or redirect the transfer or the system may apply a default action (e.g., return the value to the user). This situation may occur, for example, if an electronic mail notification of the transaction to the other party is undeliverable (e.g., incorrect address, party's electronic mail server is unavailable).

If the party identifier is a valid identifier, but is not associated with the intended party, rectifying the situation may be more difficult. For example, if the transaction has already been closed and the value credited to the incorrect party, the transaction may be irreversible. The initiating user may, of course, contact that party and attempt to retrieve the value.

If the party identifier is valid but is not associated with the intended party and the transaction has not yet closed, the user may be able to retrieve the value. Some period of time (e.g., six months) may be established for automatically canceling or reversing uncleared transactions or during which the user may request cancellation of the transaction. For example, if a user initiates a transaction and six months later the recipient still has not claimed the value, the system may automatically reverse or cancel the transfer. Before that time, however, the initiating user may have to request the transaction be nullified. The system may attempt to contact the incorrect party before doing so.

Registering a New User in One Embodiment of the Invention

As described earlier, in one embodiment of the invention a user must be registered with the value exchange system before being able to initiate or close a transaction with the system. This section describes one method of registering a new user, during which the user may download or otherwise receive software configured to allow the user's client device to interact with the system and/or other user's clients.

Illustratively, a new user may register with the system in many ways, such as through a system web site, via a web-enabled telephone, via normal voice telephone contact, via electronic or normal mail, etc. The level of access or degree to which a user may employ the system after registration may, however, depend upon how the user registers, how much information is provided during registration, how much of the information is verified, etc. For example, if a user-provided telephone number, electronic mail address, street address, and/or other information is all verified, the user may be granted greater system access or be allowed to conduct transactions involving more value than if the information is incorrect, unverifiable or not provided.

In one embodiment of the invention a potential new user connects to communication (e.g., web) server 104 of the system of FIG. 1 and completes a registration form. Advantageously, the registration process is done in a secure mode (e.g., with SSL (Secure Sockets Layer)). The registration form may elicit or require personal information such as name, residential (e.g., street) address, telephone number(s) (e.g., daytime, nighttime, mobile), etc. Information to be associated with the user's account is also requested, such as an electronic mail address, social security number, some information that may be used for security purposes (e.g., mother's maiden name), etc. The user may also be prompted to enter a password to be used for the new account and/or a PIN (Personal Identification Number) for activating system software on the user's mobile device. Illustratively, when the user wishes to initiate or accept a transaction while using his mobile device, he may be required to enter the PIN before the software will function.

The user may be required to agree to specific terms for using the system. The system may then attempt to verify one or more pieces of information provided by the user. Thus, a confirmation communication may be sent to the user's street address, electronic mail address, mobile device, etc. A confirmation communication may include a code (e.g., a PIN) that the user is instructed to provide to the system (e.g., web server 104) in order to complete or continue the registration process.

In an embodiment of the invention in which a new user registers with the system using a smart or web-enabled telephone, the registration process may be tailored to the device and the limited display means of such a device. Thus, some of the registration information (e.g., telephone number, name) could be derived from the telephone or the signal received from the telephone. And, the information required of the user may be reduced to a minimum if it must be entered through the telephone's keypad.

Illustratively, some of the information associated with a system user may be required to be unique. For example, in an embodiment of the invention in which transaction participants may be identified by their electronic mail addresses, the system may require a one-to-one mapping between addresses and users. In another embodiment users may be identifiable by telephone numbers. Again, the system may allow each telephone number to be associated with only a single user, although extension numbers could, perhaps, be added to differentiate between multiple users reachable at one number. One reason for this limitation is to allow a value exchange participant to identify another participant using a common identifier that is, or may be, already known. In one alternative embodiment, however, a user may be known by an account number or other identifier generated by or for the system. In another alternative embodiment, some or all users may be identified by multiple identifiers, in which case multiple users may be associated with a particular identifier (e.g., electronic mail address) but also have other identifiers that distinguish them.

After a user is registered with the system, he or she may then establish an initial and/or default method of providing funds. For example, the user may identify a credit card, a bank account, a debit card or other source of value to be charged when the user transfers value to another person or at other times when value must be added to the user's system account. The amount of system credit or the limit placed on the user's system activity may be determined in part or in whole by the form of value transfer the user employs, the level of credit or value transfer authorized by the user's financial institution, the degree to which the user's personal or account information has been verified, etc. For example, if the user's street address cannot be verified (e.g., he or she does not submit the code mailed to the address they provided), or the address of his/her credit card does not match his/her mailing address, or the user's credit card limit is low, then he or she may be limited to a first level of system usage. If, however, the user's personal or financial information is verified and/or their credit card limit is relatively high, he or she may be allowed to transfer much more value through the system. In short, the level of trust, authentication, verification or security that the user provides to the system may affect the amount or level of system usage the user is granted.

Until a user submits credit or debit information his or her system limit may be kept at zero, indicating that he or she is not authorized to transfer value to other parties. The user may, however, be able to receive value transfers as soon as he or she is registered.

A user may also be able to place value in his or her system account through direct deposit, a personal check, electronic funds transfer, etc. Illustratively, however, funds submitted via these methods are not available for transfer until they clear. Users may choose multiple methods of depositing value into their accounts (and retrieving value from their accounts) and may be required to provide whatever information is necessary (e.g., bank routing or account number) to implement those methods.

Registration may or may not be required before a user can download and install software configured to allow a user to make a value exchange. A software download may be part of the registration process or may, alternatively, be conducted before or after a user registers. The following is a description of a software download/installation process according to one embodiment of the invention.

To receive the software the user first connects his client device to an appropriate system server (e.g., communication server 104 or synchronization server 106 of the system of FIG. 1). The user makes a choice to download the software and may need to identify his or her device so that the correct software is provided. A registered user may also identify himself to the system, in which case the system may automatically determine (e.g., by communicating with the user's device or referring to account information in database 102) whether the user needs to update his software.

The software that is downloaded may depend upon the user's normal or expected method of accessing the system. For example, if the user employs a portable device the downloaded software may be tailored to the particular device to allow it to communicate and interact directly with the system. If the portable device is a disconnectable device that must be docked with or otherwise connected to another computer system (e.g., a desktop or workstation, herein termed a "conduit" computer) in order to communicate with the system, then the downloaded software may include modules for the disconnectable device and/or the other computer system.

The appropriate software is then copied to the user's device. Other software, perhaps provided by a manufacturer or vendor of the user's device may need to be in operation in order to fully install the system software. For a disconnectable portable computing device, a first software module is installed on the conduit computer, after which the device may be docked in order to install a second module on the device. The first module may be configured to synchronize the user's locally stored data and information with synchronization server 106, while the second module may be configured to conduct disconnected transactions and communicate them to the conduit computer. Thus, after a transaction is conducted with the client while disconnected, it is communicated to the conduit computer, which then synchronizes with synchronization server 106. The client software module may be considered a "wallet" application.

Illustratively, after new software is downloaded, and before the user can use his portable device to transfer value to another person, he must be authenticated to the system. Thus, in one embodiment of the system the user inputs his username (e.g., account name, electronic mail address or other system identifier) and password, which the conduit passes to the system (e.g., synchronization server 106, security server 110) for verification. If the user is verified, a pair of cryptographic keys may be generated (e.g., by the conduit computer or security server 110). In the presently described embodiment the user's conduit computer generates the key pair and passes the public key to the system to be signed. The signed key may be returned in encrypted form (e.g., encrypted with the user's PIN). Illustratively, both the private key and signed public key are then stored only on the user's portable device (i.e., not on the conduit).

When a user installs new software (e.g., a new version), uncleared transactions may be automatically cleared (with synchronization server 106) or archived. If the user installs new software on a different device, the digital certificate on the original device may be invalidated.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A computer-implemented method of facilitating a value exchange between multiple users in a distributed value exchange system, the method comprising:
    (a) registering a first user with the value exchange system, wherein the first user is assigned a first account with the value exchange system;
    (b) receiving at the value exchange system a value exchange transaction from the first user, wherein said transaction involves a second user and includes:
        (i) a pre-existing identifier of the second user, wherein the pre-existing identifier enables communication with the second user independent of the value exchange system; and
        (ii) a value to be exchanged between the first user and the second user;
        wherein the first user sends the value exchange transaction to the value exchange system without informing the second user of the value exchange transaction; and
    (c) at the value exchange system:
        (i) computer-generating a notification of said value exchange transaction;
        (ii) electronically sending said notification to the second user; and
        (iii) prior to said electronically sending, debiting said value from one of said first account and a second account associated with the second user, and crediting said value to the other of said first account and said second account.

2. The method of claim 1, further comprising:
    registering the second user with the value exchange system if not already registered.

3. The method of claim 1, wherein said value to be exchanged between the first user and the second user is to be transferred from the first user to the second user.

4. The method of claim 1, wherein said value to be exchanged between the first user and the second user is to be transferred from the second user to the first user.

5. The method of claim 1, wherein said pre-existing identifier is a telephone number.

6. The method of claim 1, wherein said pre-existing identifier is an electronic mail address.

7. The method of claim 1, wherein said receiving a value exchange transaction comprises:
    initiating a value exchange involving a second user on a mobile client device of said first user;
    establishing a connection between the first user and the value exchange system; and
    transmitting said value exchange to the system.

8. The method of claim 7, wherein said initiating a value exchange transaction comprises establishing a communication link between the first user's mobile computing device and a second user's mobile client device.

9. The method of claim 1, wherein said value exchange transaction is received from the first user through a mobile communication device.

10. The method of claim 9, wherein the mobile communication device is a personal digital assistant.

11. The method of claim 9, wherein the mobile communication device is a telephone.

12. The method of claim 9, wherein the mobile communication device is a two-way pager.

13. The method of claim 9, wherein said value exchange transaction is received from the mobile communication device through a wireless network.

14. The method of claim 9, wherein the mobile communication device is a disconnectable device.

15. The method of claim 1, further comprising converting said value to be exchanged between the first user and the second user from a first form to a second form.

16. The method of claim 15, wherein said first form is a first currency and said second form is a second currency.

17. The method of claim 1, wherein a form of said value to be exchanged between the first user and the second user depends on the pre-existing identifier.

18. The method of claim 1, further comprising holding said value to be exchanged between the first user and the second user in escrow with an escrow party until said value exchange transaction is completed.

19. The method of claim 1, further comprising repeating (b) and (c) for a second value exchange transaction between the second user and a third user.

20. The method of claim 1, wherein an asymmetric cryptographic scheme is applied to secure said value exchange transaction.

21. A computer-implemented method of facilitating an exchange of value between multiple users through a distributed transaction system separate from the multiple users, the method comprising:
  (a) receiving an instruction from a first user to exchange a value with a second user, wherein the first user is a registered user of the distributed transaction system and the instruction includes:
    (i) an identifier of a second user not registered with the distributed transaction system, wherein said identifier is usable to identify the second user independently of the distributed transaction system; and
    (ii) the value to be exchanged between the first user and the second user;
  (b) notifying the second user of said value exchange in an electronic communication from the distributed transaction system;
  (c) registering the second user with the distributed transaction system at a computer, wherein the distributed transaction system comprises the computer;
  (d) debiting said value from an account of one of the first user and the second user; and
  (e) crediting said value to an account of the other of the first user and the second user;
  wherein no term of said value exchange is negotiable by the second user after said receiving and before said debiting and said crediting.

22. The method of claim 21, wherein said identifier is an electronic mail address.

23. The method of claim 21, wherein said identifier is a telephone number.

24. The method of claim 21, wherein said instruction is received through a mobile communication device operated by the first user.

25. A computer readable storage medium storing instructions that, when executed by a computer, cause the computer to perform a method of facilitating a value exchange between multiple users in a distributed value exchange system, the method comprising:
  (a) registering a first user with the value exchange system, wherein the first user is assigned a first account with the value exchange system;
  (b) receiving at the value exchange system a value exchange transaction from the first user, wherein said transaction involves a second user and includes:
    (i) a pre-existing identifier of the second user, wherein the pre-existing identifier enables communication with the second user independent of the value exchange system; and
    (ii) a value to be exchanged between the first user and the second user;
  wherein the first user sends the value exchange transaction to the value exchange system without informing the second user of the value exchange transaction; and
  (c) at the value exchange system:
    (i) computer-generating a notification of said value exchange transaction;
    (ii) electronically sending said notification to the second user; and
    (iii) prior to said electronically sending, debiting said value from one of said first account and a second account associated with the second user, and crediting said value to the other of said first account and said second account.

26. A computer readable storage medium storing instructions that, when executed by a computer, cause the computer to perform a method of facilitating an exchange of value between multiple users through a distributed transaction system, the method comprising:
  (a) receiving an instruction from a first user to exchange a value with a second user, wherein the first user is a registered user of the distributed transaction system and the instruction includes:
    (i) an identifier of a second user not registered with the distributed transaction system, wherein said identifier is usable to identify the second user independently of the distributed transaction system; and
    (ii) the value to be exchanged between the first user and the second user;
  (b) notifying the second user of said value exchange in an electronic communication from the distributed transaction system;
  (c) registering the second user with the distributed transaction system at a computer, wherein the distributed transaction system comprises the computer;
  (d) debiting said value from an account of one of the first user and the second user; and
  (e) crediting said value to an account of the other of the first user and the second user;
  wherein no term of said value exchange is negotiable by the second user after said receiving and before said debiting and said crediting.

27. A system for facilitating the transfer of value from one user to another user, comprising:
  means for receiving a value transfer request from a value provider, wherein said value transfer request comprises:
    an electronic mail address of a value receiver; and
    a first value to be transferred from the value provider to the value receiver;
  means for debiting said first value from a first account associated with the value provider and crediting a second account associated with the value receiver; and
  means for notifying the value receiver of said value transfer only after said first value is debited from the first account and credited to the second account;
  wherein the value receiver is identifiable, for purposes of said value transfer, only by said electronic mail address.

28. A computer-implemented method of transferring value, comprising:
  receiving a connection from a registered user of a value transfer system, wherein the registered user has a first account with the value transfer system and the first account is identified by a first electronic mail address of the registered user;
  receiving from the registered user a request to execute a transfer of value to another party, wherein the other party is identified only by a second electronic mail address, the request comprising:
said second electronic mail address; and
a first value to be transferred to the other party;
creating for the other party a second account with the value transfer system, if the second account does not already exist, wherein the second account is identified by said second electronic mail address;
at the value transfer system, transferring said first value from the registered user to the other party by debiting the first account by said first value and crediting the second account by said first value; and
only after said first value is transferred, sending notification of said transfer from said value transfer system to the other party via electronic mail;
wherein the unregistered party is not informed of said transfer by the registered user.

29. A computer-implemented method of transferring value, comprising:
receiving a connection from a first user of a value transfer system;
receiving from the first user a request to execute a value transfer to a second user, the request comprising:
an electronic mail address of the second user; and
a first value to be transferred to the second user;
debiting said first value from an account of the first user;
crediting said first value to an account of the second user; and
only after said debiting and said crediting, sending a notification of said value transfer from said value transfer system to the second user via electronic mail;
wherein said electronic mail address is sufficient for said value transfer system to transfer said first value from an account of the first user to an account associated with the second user; and
wherein the second user is not informed of said value transfer until the second user receives said notification.

30. The method of claim 1, wherein said registering the first user comprises creating said first account.

31. The method of claim 30, wherein said receiving comprises said registering.

32. The method of claim 1, further comprising:
creating said second account; and
registering the second user.

33. A distributed value exchange system for facilitating a value exchange between multiple users, the value exchange system comprising:
(a) registration means for registering a first user with the value exchange system, wherein the first user is assigned a first account with the value exchange system;
(b) receiving means for receiving at the value exchange system a value exchange transaction from the first user, wherein said transaction involves a second user and includes:
(i) a pre-existing identifier of the second user, wherein the pre-existing identifier enables communication with the second user independent of the value exchange system; and
(ii) a value to be exchanged between the first user and the second user;
wherein the first user sends the value exchange transaction to the value exchange system without informing the second user of the value exchange transaction; and
(c) notification means for:
(i) computer-generating a notification of said value exchange transaction; and
(ii) electronically sending said notification to the second user; and
(d) value exchange means for:
(i) debiting said value from one of said first account and a second account associated with the second user; and
(ii) crediting said value to the other said first account and said second account.

* * * * *